July 5, 1960     C. L. STAFFORD     2,943,536
TILTABLE MIRROR SUPPORTS
Filed May 21, 1958
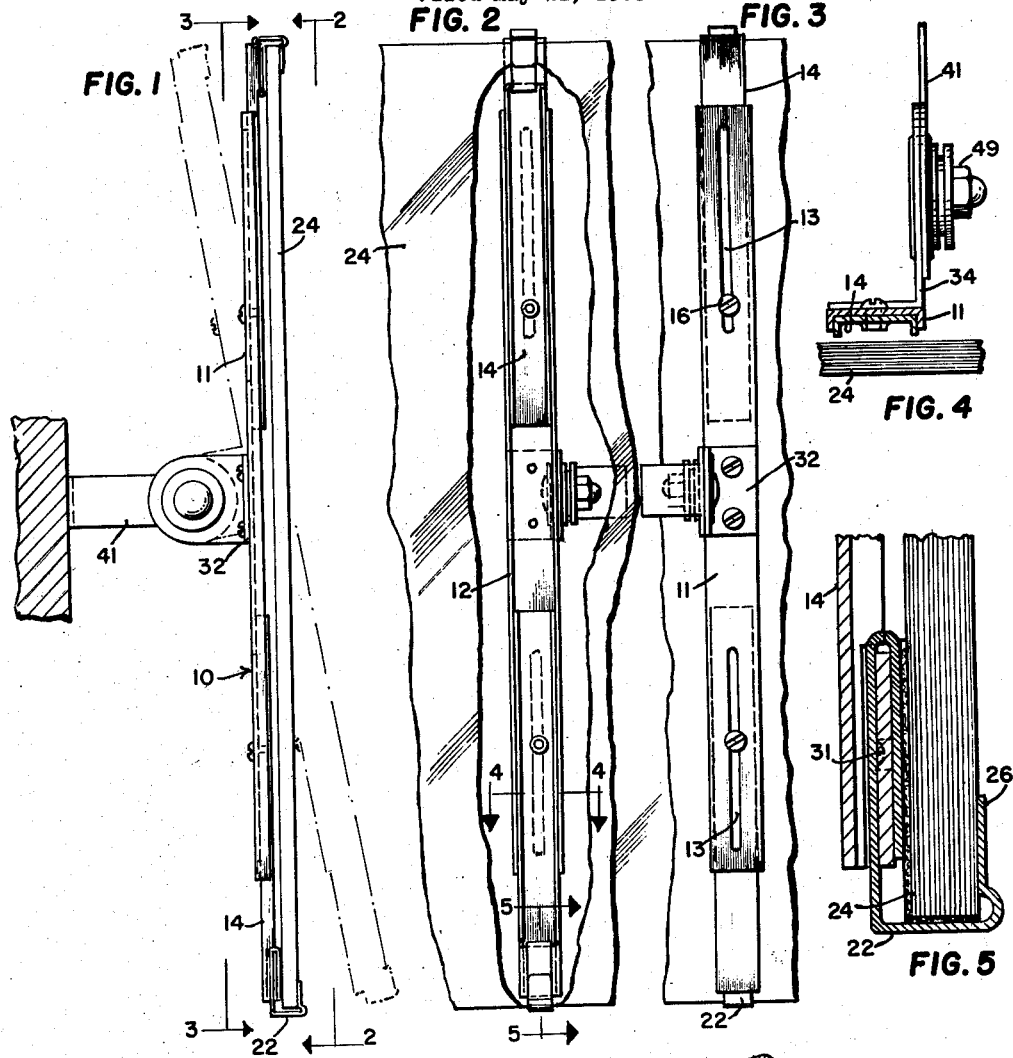
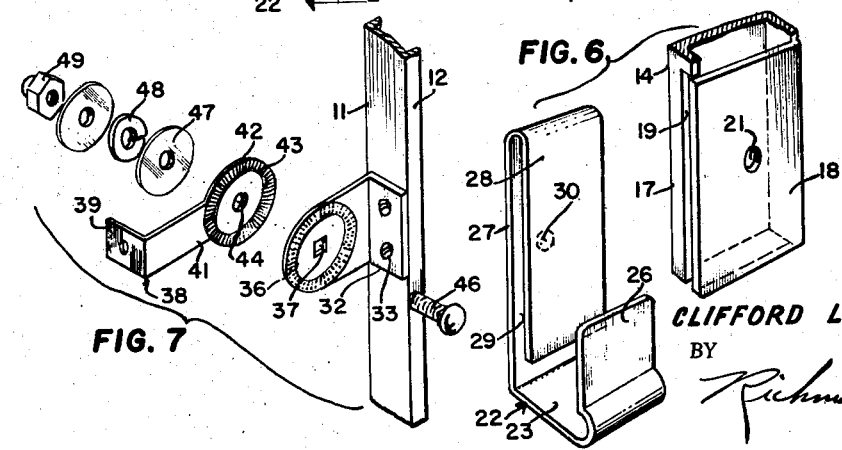
INVENTOR.
CLIFFORD L. STAFFORD
BY
*Richmond A. Hayes*
ATTORNEY United States Patent Office 2,943,536
Patented July 5, 1960

2,943,536
TILTABLE MIRROR SUPPORTS

Clifford L. Stafford, Jamestown, N.Y., assignor to Chautauqua Hardware Corporation, Jamestown, N.Y., a corporation of New York Filed May 21, 1958, Ser. No. 736,884

4 Claims. (Cl. 88—97)

This invention relates to improvements in mirror supports and particularly to supports that embody structure adaptable to mount mirrors of different sizes and in a manner to enable their being tilted.

Generally speaking, mirror supports may be considered as either of two types. One type is that which, to some extent, frames or embraces a mirror and constitutes an ornamental part of an entire assemblage such, for example, as a chest or dresser. The other type is generally acknowledged to be that which is attached to the rim or back of a mirror and includes relatively movable parts that enable vertical adjustment and, in some instances, tilting or turning. With this latter type, provision is also made to secure the support to a wall or upright that permits locating a mirror at a desirable elevation such as above a dressing table, chest, etc.

One of the objects and advantages of the present invention lies in the provision of a support that may engage and mount mirrors of different sizes and proportions.

Another object of the invention lies in the provision of a mirror support in which the mirror engaging parts are self-adjusting.

A further object of the invention lies in the provision of a mounting bracket for a mirror support embodying the present invention that enables swinging or tilting the mirror to any desired position of use.

Another and further object of the invention lies in the provision of a mounting bracket for a mirror support that not only enables swinging or tilting the mirror but is selectively attachable to a wall or upright member without in any way interfering with the predetermined extent to which the mirror and support may be tilted.

It is also an object of the invention to provide, in the mounting bracket, means by which the mirror and support may be manually tilted to any given position and will remain in such position without having to be so secured by some additional clamping or locking structure.

Other objects and advantages of the invention will be more fully understood from a consideration of the following specification, taken in conjunction with the accompanying drawing; in which Fig. 1 is a side elevational view of a mirror support embodying one form of the invention and shows the support as it appears when attached to an upright member or wall, the dotted lines suggesting to some extent the tiltable feature of the invention.

Fig. 2 is a front elevational view of the support with the mirror broken away for this purpose, being taken substantially as suggested by the line 2—2 of Fig. 1;

Fig. 3 is a rear elevational view of the support, being taken substantially as suggested by the line 3—3 of Fig. 1;

Fig. 4 is an enlarged horizontal sectional view, taken substantially on the line 4—4 of Fig. 2;

Fig. 5 is a greatly enlarged fragmentary vertical sectional view, taken substantially on the line 5—5 of Fig. 2;

Fig. 6 is a fragmentary exploded perspective view, showing the means for attaching the mirror engaging clips to an extended portion of the support; and Fig. 7 is an exploded perspective view of the parts that enable swinging the mirror support about a mounting bracket.

Referring more particularly to the drawing, the reference numeral 10 is employed to generally designate a mirror support embodying one form of the invention. As shown, the support proper comprises an elongated channel member 11, the side walls 12 thereof being relatively shallow. Adjacent each end of the member 11, an elongated slot 13 is made in the channel base wall. It is proposed to mount an extendable bar 14 in each end of the member 11. In the present instance, the bar 14 (Figs. 2 and 6) is also of the nature of a shallow channel which is proportioned to have a slidable fit with the channel member 11. Screws 16 project through the slots 13 into engagement with threaded openings in the bars 14 and, when turned down, secure these bars in any desired extended position. It will, of course, be noted that the bars 14 are for the purpose of elongating the entire mirror support to adapt it to engagement with mirrors of different lengths, the bars, of course, being limited in their adjustment to the length of the slots 13.

The free end 17 of each channel bar 14 is provided with a flange 18 which is a right angle continuation of one of the side walls of the channel bar and extends across a small area of the channel thereof, terminating at the other edge of the bar and fitting into a cut-away or notch 19 in the side wall remote from that from which the flange 18 extends. This structure is clearly shown in Fig. 6 of the drawing. Centrally, the flange 18 is formed with an opening 21, the purpose of which will hereinafter be fully set out.

Due to the fact that not all mirrors are square or rectangular, but in some instances may include angular or curved marginal edges, it is essential that any clips or clamps engageable with such edges must, to some extent at least, be self-aligning or self-adjusting, if the support is to firmly engage and mount a glass panel. To the end that adequate engagement and adjustment of the glass engaging means is provided, the present invention discloses a clip 22 which includes a base wall 23 suitable for engagement with the edge of a mirror 24. Forwardly of the base 23 is an upstanding tongue 26 which is intended to engage the frontal margin of a mirror. Spaced rearwardly from and parallel to the tongue 26 is a flange 27. This flange is of considerably greater length than that of the tongue and is integral with a spaced, return-bent flange 28. Flanges 27 and 28 provide a narrow, side opening passageway or enclosure 29. Centrally of the flange 29 is a blister 30, the general proportions of which are slightly less than the diameter of the opening 21 of flange 18. To protect or cushion the glass, the facing surfaces of base 23, tongue 26 and flange 28 may be provided with felt or other suitable material.

To assemble the clips 22 with the extendable bars 14, it is essential that flange 18 of each bar be bent slightly outwardly so that the free edge thereof clears the adjacent side wall of the bar channel. The clip 22, being formed of spring metal, is engaged with the bar by forcing it onto the flange 18. Of course, the blister on the clip tends to spring flanges 27 and 28 slightly apart, thereby creating tension and, as the clip is moved further onto the flange 18, the blister registers with the opening 21 and flanges 27 and 28 spring back into place. Flange 18 is now bent so that the edge thereof enters the notch 19 to locate the clip in a plane parallel with the bar 14. In a sense, the flange 18 secures the clip against displacement. However, due to the fact that the flanges 27 and 28 are of spring metal, engagement of the blister with the opening 21 would adequately serve this purpose. Since the blister loosely fits the opening 21, it is apparent that the clip may have slight movement in the direction of the length of the bar and may also rotate or swivel to a slight extent about the pivot created by interfitting the blister with the opening 21. Thus, each clip may automatically adapt or adjust itself to a mirror edge when the support is assembled with a mirror of any given marginal proportions.

Centrally of the rear surface of the channel member 11, a bracket 32 is mounted, being secured in any suitable manner, as by screws 33. A right angle flange 34 of this bracket terminates in a circular end portion having a series of circularly arranged, radial serrations 36. A centered opening 37 is formed in this flange within the area defined by the serrations. A mounting arm 38 is provided and includes an attaching flange 39 and an arm 41. At its end, the arm 41 includes a circular portion 42 having a series of radial serrations 43 corresponding in position and spacing with the serrations 36. Portion 42 is also provided with an opening 44. When the serrations 36 and 43, on the circular portions of the bracket and arm, are interfitted, a screw 46 is projected through the openings of these parts and, through suitable spacing and locking washers 47 and 48, into engagement with a nut 49. The nut is turned down to a point such that, although the serrations of the bracket and arm are interengaged and will normally hold the mirror support and arm in given angular relationship, the support may, nevertheless, be tilted or pivotally moved about the screw 46, due to the lateral yielding of the serrations by reason of the spring washer 48. Of course, any desired freedom or tightness as may be required is possible by merely tightening or loosening the nut 41 and it may be added that the degree of tightness is at least partly by the extent to which the bars 14 have been extended to accommodate the support to a mirror of a given size. In other words, a larger mirror would require greater tension as between the serrations to prevent inadvertent tilting than would a mirror of lesser size and weight.

As shown in the drawing, the arm 41 of the bracket 32 is attached to a vertical building wall and this method of mounting a mirror support embodying the invention is found suitable in many instances. However, to provide additional flexibility or convenience in mounting, it is contemplated that the mounting arm 41 may be secured in any suitable manner to a channel member. By so doing, it will be evident that the vertical location of the mounting bracket may be changed to locate the mirror support at any desired position above a chest or other article of furniture and, following such location, the mirror will still be tiltable for convenient use. Of course, no provision is made in the above referred to application for tilting the mirror, only the provision of a simple mirror support with vertical adjustment being contemplated.

Although applicant has shown and described only one form of his invention, it will be apparent that variations in the details of the interfitting parts of the entire structure may be made in its adaptation to mirrors of different size and weight and that such variations are contempalted as being within the spirit and scope of the invention as set out in the annexed claims.

Having thus set forth my invention, what I claim as new and for which I desire protection by Letters Patent is:

1. A mirror support comprising a channel member having lengthwise slots adjacent the ends thereof, extendable bars mounted in the ends of said member, screws projecting through said slots into engagement with said bars and serving to secure said bars in any extended position within the limits defined by said slots, a flange integral with and extending across the end of each of said bars to provide an enclosure, a mirror engaging clip, a return bent flange of said clip engaging and enclosing said bar flange, the other flange of said clip being within said enclosure, means loosely securing said clip to said flange whereby to enable adjustment of said clip into full engagement with the edge of a mirror, and a mounting bracket for said support, the connection between said support and said bracket including means enabling swinging said support and a mirror carried thereby.

2. A mirror support comprising a channel member having lengthwise slots adjacent the ends thereof, extendable bars mounted in the ends of said members, screws projecting through said slots into engagement with said bars and serving to secure said bars in any extended position within the limits defined by said slots, a flange integral with and extending across and enclosing the area at the end of each of said bars, a mirror engaging clip, connected spring metal flanges on said clip providing an enclosure for receiving and loosely interfitting said bar flange whereby to so secure said clip as to permit adjustment thereof to fully engage the edge of a mirror, and a mounting bracket for said support, the connection between said support and said bracket consisting of a friction swivel structure to enable tilting said support and a mirror carried thereby.

3. A mirror support comprising a channel member having lengthwise slots adjacent the ends thereof, extendable channel bars mounted in the end portions of said member, screws projecting through said slots into engagement with said bars and serving to secure said bars in any extended position within the limits defined by said slots, a flange integral with one of the sides of each of said channel bars and extending across and enclosing the channel area at the bar ends, a mirror engaging clip at the end of each of said bars, a pair of end joined spring metal flanges on said clip providing an enclosure receiving said bar flange, one of said spring flanges lying within the bar channel and including a lateral projection projecting loosely into an opening in said bar flange, said clip thus being slightly swivelable to adapt it to full engagement of a mirror edge, and centrally located means for mounting said support to enable tilting.

4. In a mirror support consisting of a channel member fitted with extendable channel bars at the ends thereof, a flange extending across and enclosing the channel area at the free end of each of said bars, a mirror engaging clip at each of the free ends of said bars, said clip comprising a base engageable with a mirror edge, a frontal tongue extending from said base and engageable with the front margin of a mirror, a rear flange spaced from and substantially parallel with said tongue, a forwardly directed blister on said rear flange, a return bent flange overlying said blister and cooperating with said rear flange to provide a restricted enclosure receiving the bar flange and effecting engagement of said blister with an opening in said bar flange whereby to loosely secure said clip and permit adjustment thereof to fully engage the mirror edge.

References Cited in the file of this patent

UNITED STATES PATENTS

| | | |
|---|---|---|
| 911,568 | Bickford | Feb. 9, 1909 |
| 926,840 | Bagaason | July 6, 1909 |
| 1,565,291 | Pearch | Dec. 15, 1925 |
| 2,016,942 | Horwith et al. | Oct. 8, 1935 |
| 2,029,091 | Bern | Jan. 26, 1936 |
| 2,051,406 | Green | Aug. 18, 1936 |
| 2,696,962 | Goss | Dec. 14, 1954 |